(12) United States Patent
Estevez et al.

(10) Patent No.: US 8,761,028 B2
(45) Date of Patent: Jun. 24, 2014

(54) DYNAMIC CHANNEL ESTIMATION APPARATUS, SYSTEMS AND METHODS

(75) Inventors: Leonardo William Estevez, Rowlett, TX (US); Deric Waters, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 319 days.

(21) Appl. No.: 13/220,660

(22) Filed: Aug. 29, 2011

(65) Prior Publication Data

US 2013/0051255 A1   Feb. 28, 2013

(51) Int. Cl.
*H04J 3/14* (2006.01)
*H04W 24/00* (2009.01)
*H04L 12/26* (2006.01)

(52) U.S. Cl.
CPC ............... *H04W 24/00* (2013.01); *H04L 43/50* (2013.01); *H04J 3/14* (2013.01)
USPC ............ 370/242; 370/248; 370/252; 375/224

(58) Field of Classification Search
CPC ...... H04W 24/00; H04W 40/02; H04L 43/50; H04L 47/10; H04J 3/14; H04J 1/243
USPC .......... 370/244, 245, 252, 236, 238; 375/224; 455/436; 340/539.1; 342/127, 126, 133
See application file for complete search history.

(56) References Cited

U.S. PATENT DOCUMENTS

| | | | |
|---|---|---|---|
| 2003/0222819 A1* | 12/2003 | Karr et al. | 342/457 |
| 2004/0032363 A1* | 2/2004 | Schantz et al. | 342/127 |
| 2008/0157957 A1* | 7/2008 | Pitchers et al. | 340/539.1 |
| 2010/0238862 A1* | 9/2010 | Davidson et al. | 370/328 |

OTHER PUBLICATIONS

Nanotron Technologies GmbH, Real Time Location Systems (RLTS), (White Paper), Copyright 2007 Nanotron Technologies GmbH, Berlin Germany, 18 pages.

* cited by examiner

*Primary Examiner* — Ian N Moore
*Assistant Examiner* — Hien Nguyen
(74) *Attorney, Agent, or Firm* — Ronald O. Neerings; Wade James Brady; Frederick J. Telecky, Jr.

(57) ABSTRACT

Apparatus, systems, and methods disclosed herein operate to calibrate path loss parameters corresponding to a communication channel between wireless stations, including a path loss exponent. A time-of-flight (TOF) associated with packet transmissions traversing a path between a first wireless station and a second wireless station is measured. A path length D1 corresponding to the path is calculated from the TOF measurements. One or more received signal strength (RSS) measurements corresponding to the packet transmissions are then made at the first wireless station. The path loss exponent associated with the path is calculated from D1 and the RSS measurements. Some embodiments may also measure RSS values associated with transmissions from a third wireless station. The latter measurements may be used in conjunction with the previously-determined path loss exponent to derive an unknown transmission path length between the first and third wireless stations. The latter path length may be used together with other known station geometry to determine the coordinate position of the first wireless station.

15 Claims, 5 Drawing Sheets

DYNAMIC CHANNEL ESTIMATION APPARATUS, SYSTEMS AND METHODS

TECHNICAL FIELD

Embodiments described herein relate to apparatus, systems and methods associated with wireless communication technology, including structures and methods associated with signal propagation characterization and position localization.

BACKGROUND INFORMATION

Personal mobile communication (PMC) devices such as smart phones and Internet tablet computers are becoming increasingly ubiquitous. One factor driving the popularity of these devices is their use in geolocation and navigation. Built-in Global Positioning System (GPS) apparatus capture signals from GPS satellites and calculate a PMC device coordinate position from the signals. Position accuracies within 15 to 30 feet may be achieved. GPS received signal strength and frequencies largely render the GPS system line-of-sight and suitable for outdoor use, however.

There is an unserved need for location positioning and distance estimation within buildings. Examples include finding a friend or associate at a conference or convention, keeping track of children while shopping, asset tracking, electromagnetic interference (EMI) avoidance, etc.

Institute of Electrical and Electronic Engineers (IEEE) 802.11v, an emerging revision to the 802.11 wireless networking standards, defines various wireless client management enhancements to the standard. (Additional information regarding the IEEE 802.11 standard may be found in ANSI/IEEE Std. 802.11, Information technology—Telecommunications and information exchange between systems—Local and metropolitan area networks—Specific requirements—Part 11: Wireless LAN Medium Access Control (MAC) and Physical Layer (PHY) Specifications (published 1999; reaffirmed June 2003.)

Feature sets defined by 802.11v include certain wireless client localization capabilities to support PMC handoffs between wireless access points (APs). Other features include forwarding station position coordinates, transmitted signal strengths, antenna gain values, and other data around the network. Thus, under 802.11v, participants in enterprise associations with a particular AP may become aware of detailed characteristics of other clients and/or APs within a wireless network. Associated stations may make time-of-flight (TOF) measurements to determine inter-station distance based upon the speed of the signal propagation.

Such characteristics may be useful in wireless mobile device localization schemes. In some cases, however, a wireless mobile device may need to determine its distance from an AP or from another mobile device to which it is not wirelessly associated. In these cases, TOF measurements to determine distance may not be possible

SUMMARY OF THE INVENTION

Figure 1:
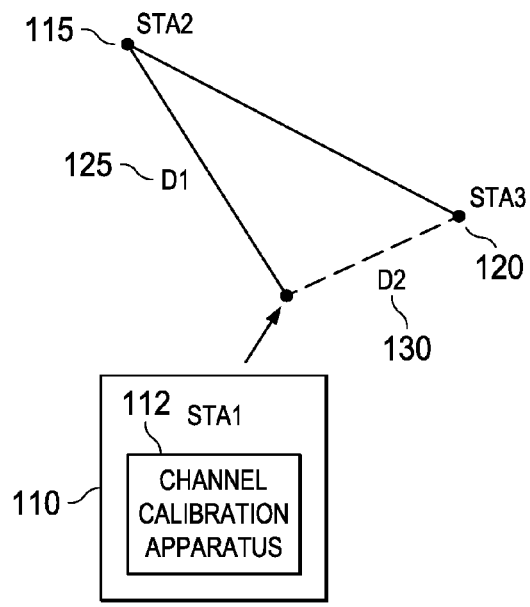
FIG. 1 is a system diagram of a wireless station incorporating a wireless channel calibration apparatus, the wireless station positioned relative to two additional wireless stations according to various example embodiments of the invention.

Embodiments and methods herein enable a wireless station to dynamically calibrate a path loss exponent N based upon channel characteristics of a transmission path between the wireless station and another wireless station. In the context of this disclosure, the terms "channel," "communication channel," and "wireless channel" shall mean a set of factors influencing the propagation of selected electromagnetic signals at a particular point in time, including, without limitation, station transmit powers, antenna gains, multipath interference characteristics, loss characteristics associated with obstructing materials, measurements of these factors and/or derivatives thereof. The term "transmission path" means a linear path traversed by an applicable electromagnetic signal.

The terms "first wireless station," "second wireless station," "third wireless station," etc. are used herein for clarity without loss of generality. Other wireless stations incorporating the invented structures may be substituted for the first wireless station. It is noted that wireless stations referenced herein may include mobile stations, including mobile access points (APs), and/or fixed stations/APs.

N-determining factors include the length D1 of a path between the two wireless stations as determined by TOF measurements. It is noted that D1 is related to the TOF measurements by the constant C, the speed of light traveling through a selected medium. Therefore, references herein to N as a function of D1 are equally applicable to N as a function of TOF. N is also dependent upon one or more received signal strength values (collectively, RSS(1)) measured at the first wireless station and corresponding to transmissions originating at the second wireless station.

In some embodiments, the first wireless station takes multiple RSS(1) measurements of radio frequency (RF) energy received from the second wireless station. The first wireless station may act upon one or more averages of RSS(1) measurements or other statistical accumulations of RSS(1) over determined periods of time to calculate N dynamically. Embodiments herein determine N from RSS(1), D1, and/or known path gain/loss parameter values. The latter parameters may include a short-range empirical RSS value corresponding to a reference path length, values of path gain parameters including transmit power levels and antenna gain values, and/or path gain coefficient constants.

An instantaneous or averaged value of the dynamically-determined N may be used in wireless systems for various purposes. In one example, N may be used to estimate channel parameters for paths between similarly-situated wireless stations. "Similarly situated" in this context shall mean positioned sufficiently proximate in location such that channel characteristics including signal attenuation caused by various materials in the path, path gain and loss characteristics due to transmit powers, antenna gains, and the like are similar. Consider a station topology wherein first and second wireless stations are wirelessly associated, the second wireless station and a third wireless station are wirelessly associated, and the first wireless station can hear but not associate with the third wireless station. Suppose that the distance D2 between the first and third wireless stations needs to be known at the first wireless station for some purpose, such as triangulation of a coordinate position of the first wireless station. In such case, the first wireless station cannot determine D2 by using TOF methods because the latter require a wireless association.

Example embodiments situated at the first wireless station may measure RSS(2) values corresponding to transmissions originating at the third wireless station and received at the first wireless station. Such embodiments operate on RSS(2) and N, the latter dynamically determined for the channel corresponding to the first and second wireless stations, to calculate the current first station-to-third station transmission path length D2. Some embodiments may also triangulate the coordinate position of the first station based upon the path lengths D1, D2 and other known wireless station/AP geometry.

DETAILED DESCRIPTION

FIG. 1 is a system diagram of a wireless station (e.g., the first wireless station STA1 110) incorporating a wireless channel calibration apparatus 112 according to various example embodiments of the invention. The STA1 110 is positioned relative to two additional wireless stations (e.g., the second wireless station STA2 115 and the third wireless station STA3 120). STA2 115 and STA3 120 may, but need not be, APs. In some environments, particularly indoor environments, a user of STA1 110 may wish to determine his/her coordinate location in the absence of a GPS or other navigation signal.

Some wireless geometries may lend themselves to determining the position of STA1 110 if the position coordinates of STA2 115 and the STA3 120 are known. STA1 110 may acquire STA2 115 and STA3 120 position coordinates through various techniques. Each AP in a multi-AP network may, for example, store a table of position coordinates corresponding to the locations of other APs in the network. The table of AP position coordinates for the network may be downloaded to a mobile station when that station associates with an AP and enters the network. Thus, for example, STA1 110 may receive position coordinates corresponding to the position of STA2 115 across the STA2-STA1 link when STA1 110 associates with STA2 115. STA1 110 may also have downloaded position coordinates for STA3 120 at a previous time. If not, and if STA1 110 is unable to associate with STA3 120, STA1 110 may request STA3 120's position coordinates from STA2 115. If STA3 120s position coordinates reside at STA2 115, the coordinates may be forwarded directly to STA1 110. If the STA3 120 position coordinates do not reside at STA2 115, then STA2 115 may send a request to STA3 120 for STA3 120's position coordinates. STA2 115 may then subsequently forward STA3 120's position coordinates to STA1 110. Through one or a combination of these techniques, STA1 110 may come into possession of position coordinates corresponding to STA2 115 and STA3 120.

If STA1 110 and STA2 115 are both 802.11v capable, the wireless channel calibration apparatus 112 may direct STA1 110 and STA2 115 to take TOF measurements to determine the STA1-STA2 transmission path length D1 125 as further described below. However, the path length D2 130 may not be immediately determinable using TOF techniques, because STA1 110 and STA3 120 are not wirelessly associated in the system configuration as described. The wireless channel calibration apparatus 112 determines the path length D2 using additional techniques described in detail below the following description of geometry associated with trilaterating STA1 110.

Figure 2:
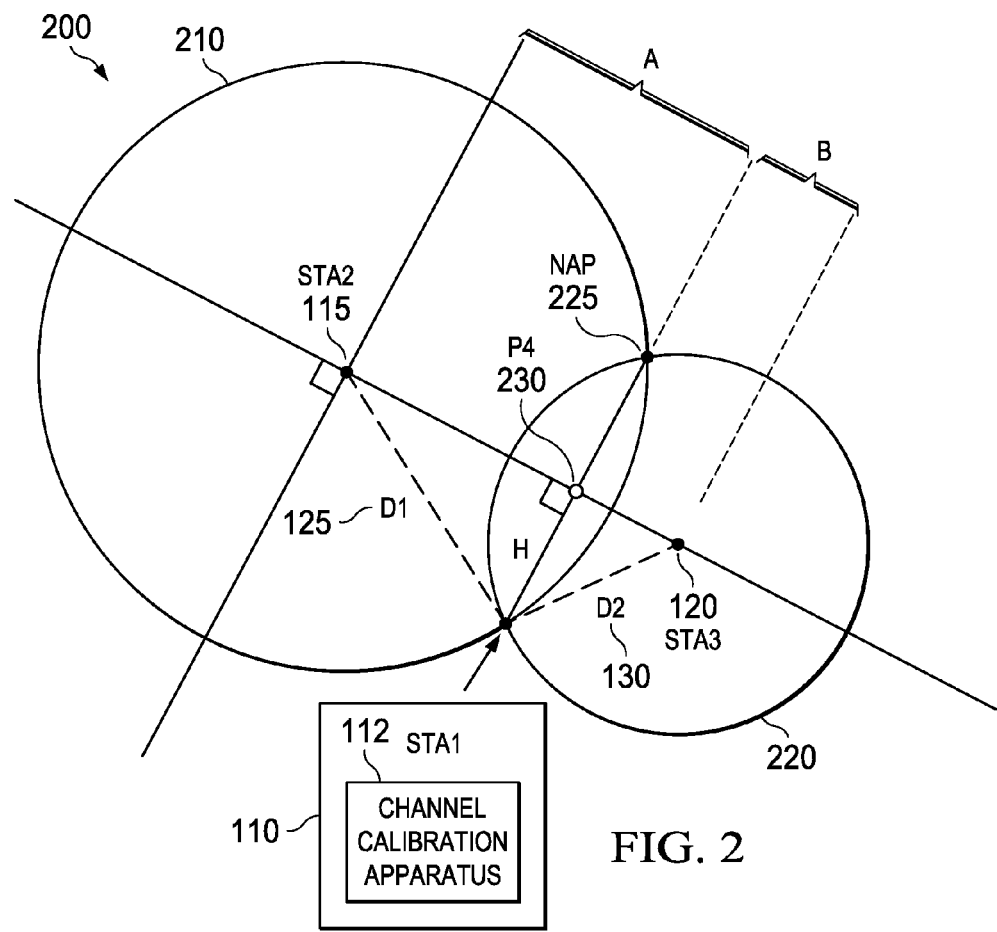
FIG. 2 is a diagram of a system including a wireless station incorporating a channel calibration apparatus and illustrating a geometric relationship between the wireless station and two additional wireless stations according to various example embodiments.

FIG. 2 is a diagram of a system 200 including a first wireless station (e.g., STA1 110) incorporating a wireless channel calibration apparatus (e.g., the apparatus 112) according to various example embodiments. FIG. 2 illustrates geometric relationship between system 200 components STA1 110, STA2 115 and STA3 120. In some embodiments, the channel calibration apparatus 112 may determine the coordinate position of STA1 110 using the coordinate positions of STA2 115, STA3 120 and the path lengths D1 125 and D2 130.

Circles 210 and 220 of radii D1 125 and D2 130, respectively, intersect at two points. One of those points is the desired coordinate position of STA1 110. The other point of intersection of the circles 210 and 220 is a non-applicable point ("NAP") 225. Specifically, assume that the coordinates of STA1 110 are (x1,y1), the coordinates of STA2 115 are (x2,y2), the coordinates of STA3 120 are (x3,y3), and the coordinates of the point P4 230 are (x4,y4). According to well-known geometric relationships corresponding to the system diagram 200, the position coordinates of STA1 110 are:

$$x1 = x4 +/- H(y3-y2)/(A+B); \text{ and}$$

$$y1 = y4 +/- H(x3-x2)/(A+B)$$

The wireless channel calibration apparatus 112 thus generates two coordinate pairs, one corresponding to the desired coordinate position of STA1 110 and the other corresponding to the NAP 225. Embodiments herein may identify the coordinate pair corresponding to the STA1 110 in various ways. For example, the channel calibration apparatus 112 may have access to a map which could be displayed to the STA1 110 user for manual discrimination. In some embodiments the STA1 110 may already have access to a coarse estimation of its location. The STA1 110 coordinate pair could be selected based upon proximity to the coarse estimation.

Figure 3:
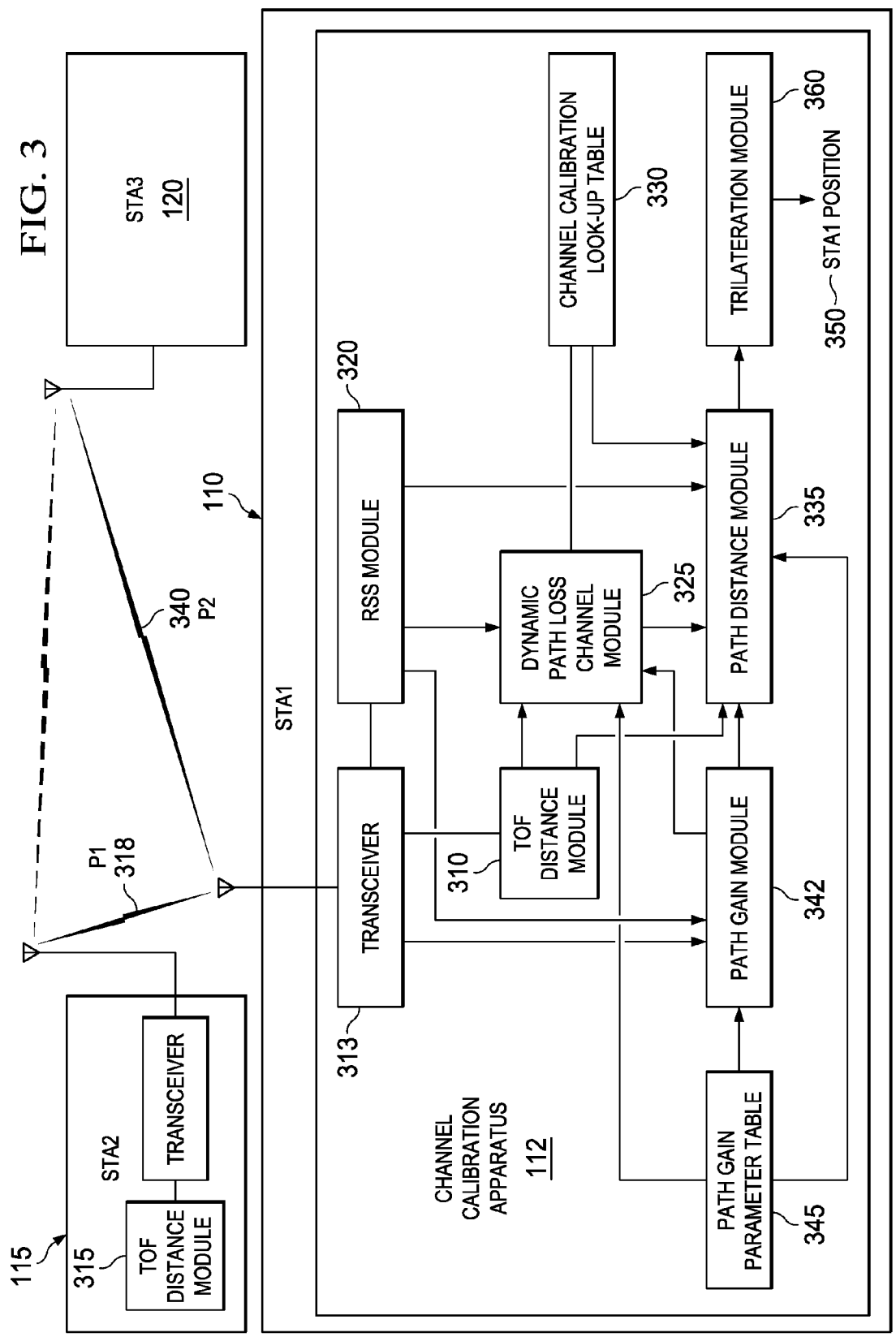
FIG. 3 is a block diagram of a wireless channel calibration apparatus incorporated into a wireless station according to various example embodiments.

FIG. 3 is a block diagram of a wireless channel calibration apparatus (e.g., the apparatus 112) incorporated into a wireless station (e.g., the STA1 110) according to various example embodiments. The channel calibration apparatus 112 includes a TOF distance module 310. The TOF distance module 310 operates via a transceiver 313 and in cooperation with a TOF distance module 315 incorporated into STA2 115. The wireless channel calibration apparatus 112 measures the TOF of one or more packet transmissions traversing a path P1 318 between STA1 and STA2. The TOF distance module 310 then calculates the length D1 125 (FIG. 1) corresponding to the path P1 318 as D1=C*TOF, C being the speed of electromagnetic signal propagation through a selected medium.

The wireless channel calibration apparatus 112 also includes an RSS module 320. The RSS module 320 determines the received signal strength RSS(1) of packet transmissions received at STA1 110 from STA2 115. The wireless channel calibration apparatus 112 further includes a dynamic channel module 325 communicatively coupled to the TOF distance module 310 and to the RSS module 320. The dynamic channel module 325 calculates the value of a path loss exponent N associated with P1 318 as a function of the path length D1 125, RSS(1), and one or more path gain/loss parameter values.

In some embodiments, the wireless channel calibration apparatus 112 may also include a channel calibration lookup table 330 communicatively coupled to the dynamic channel module 325. The channel calibration lookup table 330 stores a calibrated received signal strength value RSS(0) previously measured at a calibration receiver from a distance D0 from a calibration transmitter. Transmit and receive power gains corresponding to the calibration transmitter and receiver are substantially equivalent to the transmit and receive power gains corresponding to STA2 115 and STA1 110.

In an embodiment employing a channel calibration lookup table 330, the dynamic channel module 325 calculates the path loss exponent, as in the example calculation:

$$N=[RSS(1)-RSS(0)]/[10*\log_{10}(D1/D0)]$$

The wireless channel calibration apparatus 112 may further include a path distance module 335 communicatively coupled to the dynamic channel module 325. The path distance module 335 receives a value corresponding to the path loss exponent N as input. In some embodiments, the path distance module 335 may receive additional inputs including the calibrated received signal strength RSS(0), the calibration distance D0, and/or a second received signal strength RSS(2) associated with transmissions from STA3 120 as received at STA1 110. The path distance module 335 calculates a path length (e.g., the length D2 130 of FIG. 1) associated with a path P2 340 between STA1 110 and STA3 120, as in the example calculation:

$$D2=D0*10^{[(RSS(2)-RSS(0))/10N]}$$

Some embodiments of the channel calibration apparatus 112 may also include a path gain module 342 communicatively coupled to the RSS module 320. The apparatus 112 may use the path gain module 342 as an alternative to, or in conjunction with, the calibration lookup table 330 to determine the path loss exponent N. The path gain module 342 determines a path gain PG(D1) associated with the path P1 318 between STA1 110 and STA2 115. The path gain module 342 calculates PG(D1) as the received signal strength RSS(1) minus a known transmitted power level TXP(STA2) of transmissions from STA2 115 minus a known antenna gain AG(STA1) associated with STA1 110 minus a known antenna gain AG(STA2) associated with STA2 115:

$$PG(D1)=RSS(1)-TXP(STA2)-AG(STA1)-AG(STA2)$$

The wireless channel calibration apparatus 112 may further include a path gain parameter table 345 communicatively coupled to the path gain module 342. The path gain parameter table 345 stores the transmit power level TXP(STA2) and antenna gain value AG(STA2) associated with STA2 115, the antenna gain value AG(STA1) associated with STA1 110, the transmit power level TXP(STA3) associated with STA3 120, an antenna gain value AG(STA3) associated with STA3 120, a wavelength λ1 associated with transmissions from STA2 115, and/or a wavelength λ2 associated with transmissions from STA3 120.

In embodiments employing a path gain module 342, the dynamic channel module 325 may calculate the path loss exponent N as a function of PG(D1), the path length D1 125, and λ1 as follows:

$$N=PG(D1)/10*\log_{10}(\lambda 1/4\pi D1)$$

In such embodiments, the path distance module 335 determines the path length D2 130 as a function of RSS(2), N, the wavelength λ2, and/or a path gain value PG(D2) associated with transmissions between STA3 120 and STA1 110. Using an example calculation:

$$D2=(\lambda 2/4\pi)*10^{[(10*N)-PG(2)]},$$

where PG(2)=RSS(2)–TXP(STA3)–AG(STA3)–AG(STA2).

In some embodiments, the wireless channel calibration apparatus 112 may also include a trilateration module 360 communicatively coupled to the path distance module 335. Having determined the length D2 130 corresponding to the STA1-STA3 path, the trilateration module 360 calculates the coordinate position 350 of STA1 110 from D1 125, D2 130, the location of STA2 115, and the location of STA3 120, as previously described in conjunction with FIG. 2.

The wireless stations 110, 115, 120; the wireless channel calibration apparatus 112; the path lengths 125, 130; the system 200; the circles 210, 220; the point 230; the TOF distance modules 310, 315; the transceiver 313; the paths 318, 340; the RSS module 320; the channel module 325; the lookup table 330; the path distance module 335; the path gain module 342; the path gain parameter table 345; and the trilateration module 360 may all be characterized as "modules" herein.

Such modules may include hardware circuitry, optical components, single or multi-processor circuits, memory circuits, and/or computer-readable media with computer instructions encoded therein/thereon capable of being executed by a processor including non-volatile memory with firmware stored therein, but excluding non-functional descriptive matter), and combinations thereof, as desired by the architects of the wireless channel calibration apparatus 112 and as appropriate for particular implementations of various embodiments.

Apparatus and systems described herein may be useful in applications other than trilaterating a location of a wireless station. For example, some embodiments may use N to dynamically update knowledge of channel characteristics in order to find a shortest path to a nearby object. Examples of the wireless channel calibration apparatus 112 described herein are intended to provide a general understanding of the structures of various embodiments. They are not intended to serve as complete descriptions of all elements and features of apparatus and systems that might make use of these structures.

The various embodiments may be incorporated into electronic circuitry used in computers, communication and signal processing circuitry, single-processor or multi-processor modules, single or multiple embedded processors, multi-core processors, data switches, and application-specific modules including multi-layer, multi-chip modules, among others. Such apparatus and systems may further be included as subcomponents within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others. Some embodiments may also include one or more methods.

FIGS. 4A-4D are flow charts illustrating a number of methods associated with various example embodiments. A method 400 sequences to dynamically calibrate a path loss exponent N corresponding to channel characteristics associated with a transmission path between first and second wireless stations (e.g., STA1 and STA2 of FIG. 1, respectively). N is calibrated based upon the transmission path length D1 between STA1 and STA2, known path gain/loss parameters associated with the STA1-STA2 channel, and/or RSS values (RSS(1)) corresponding to transmissions originating at STA2 and received at STA1. D1 may be determined using TOF measurement techniques, given that STA1 and STA2 are wirelessly associated and may thus engage in TOF handshaking Such TOF measurements, detailed below, may include techniques and operations incorporated into standard IEEE 802.11v.

An instantaneous or averaged value of the dynamically-determined N may be used in wireless systems for various purposes. For example, N may be used to estimate channel parameters for transmission paths between similarly-situated wireless stations. Consider a station topology wherein STA1 and STA2 are associated, STA2 and a third wireless station (e.g., STA3) are associated, and STA1 can hear but not associate with STA3. Consider further that the STA1-STA3 path length D2 needs to be known at STA1 for some purpose, such as triangulation to determine the STA1 location. In such case, STA1 cannot determine D2 by using TOF methods because the latter require a STA1-STA3 wireless association.

The method 400 may thus include measuring one or more RSS values RSS(2) corresponding to transmissions originating at STA3 and received at STA1. The method 400 may use the measured RSS(2) value(s) and N as dynamically determined for the STA1-STA2 channel to calculate the current STA1-STA3 path length D2. The method 400 may also include triangulating the coordinate position of STA1 based upon the path lengths D1, D2 and other known wireless station/AP geometry.

Figure 4A:
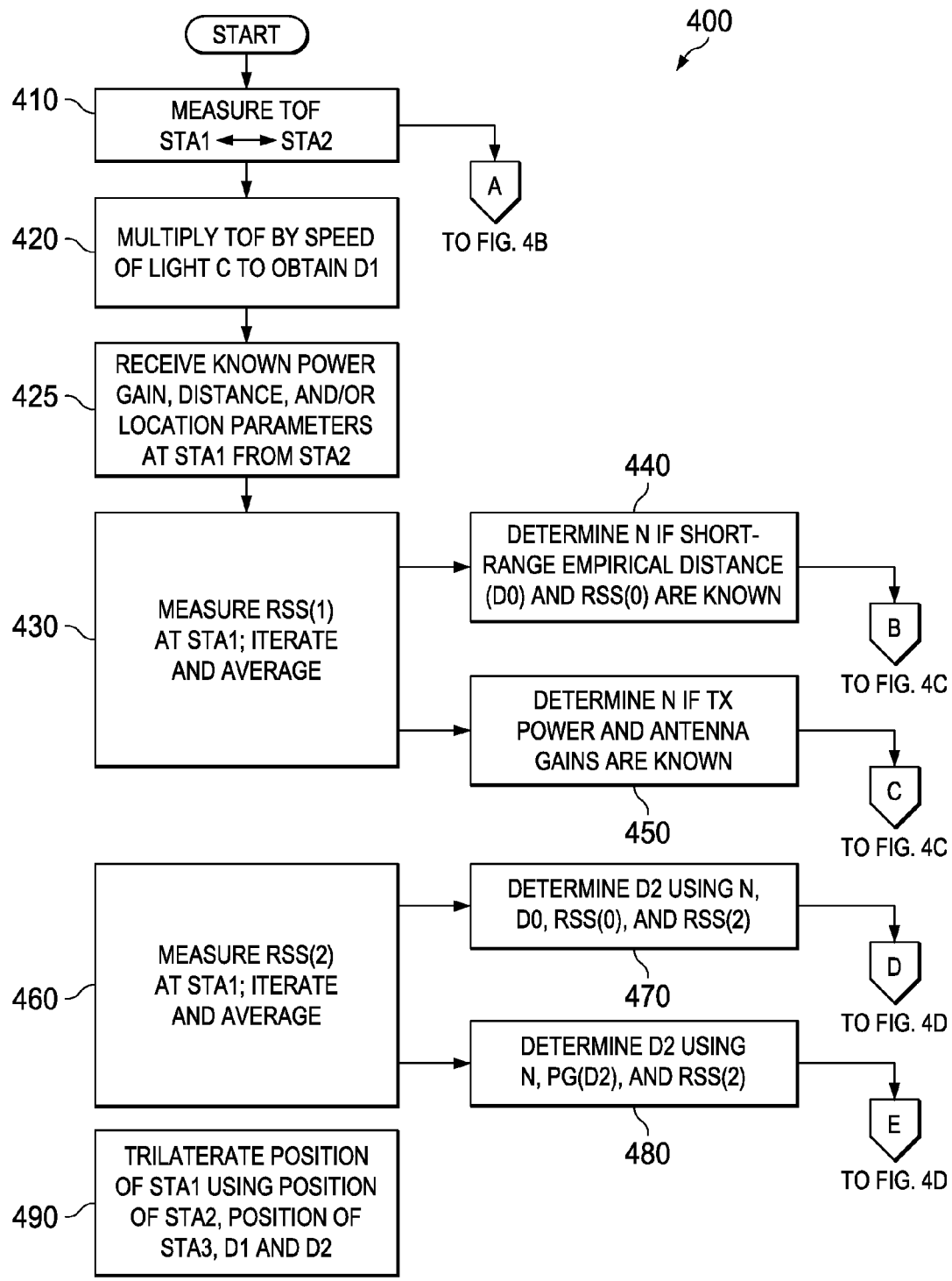
FIGS. 4A-4D are flow charts illustrating a number of methods associated with various example embodiments.
Figure 4B:
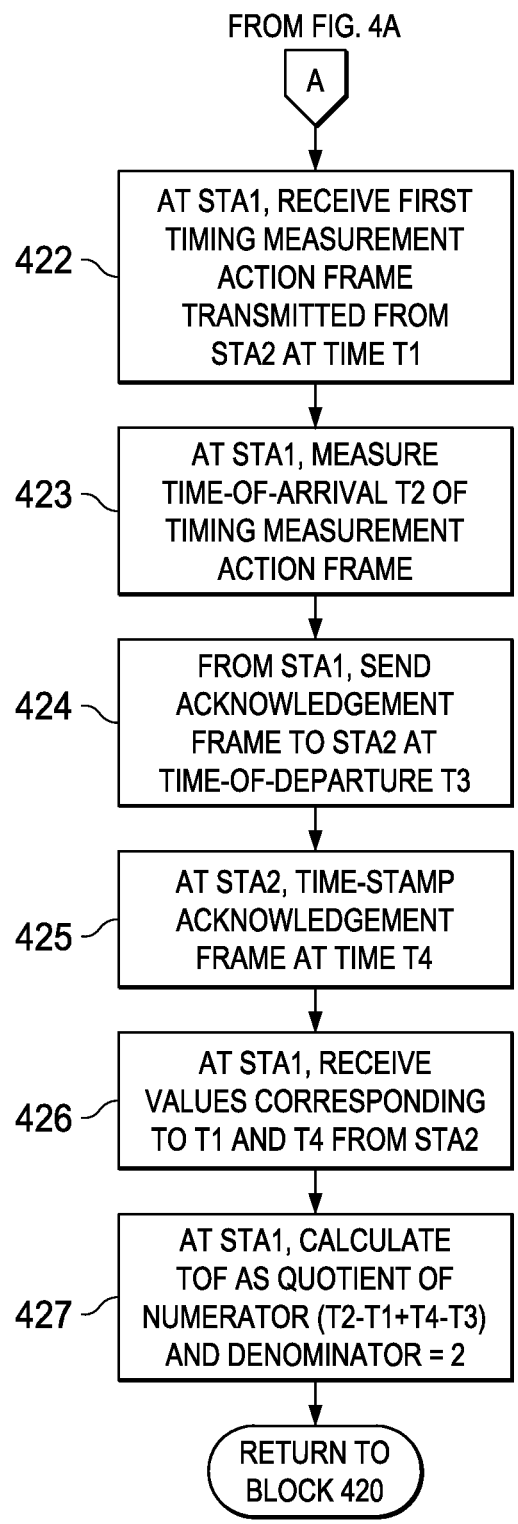
Figure 4C:
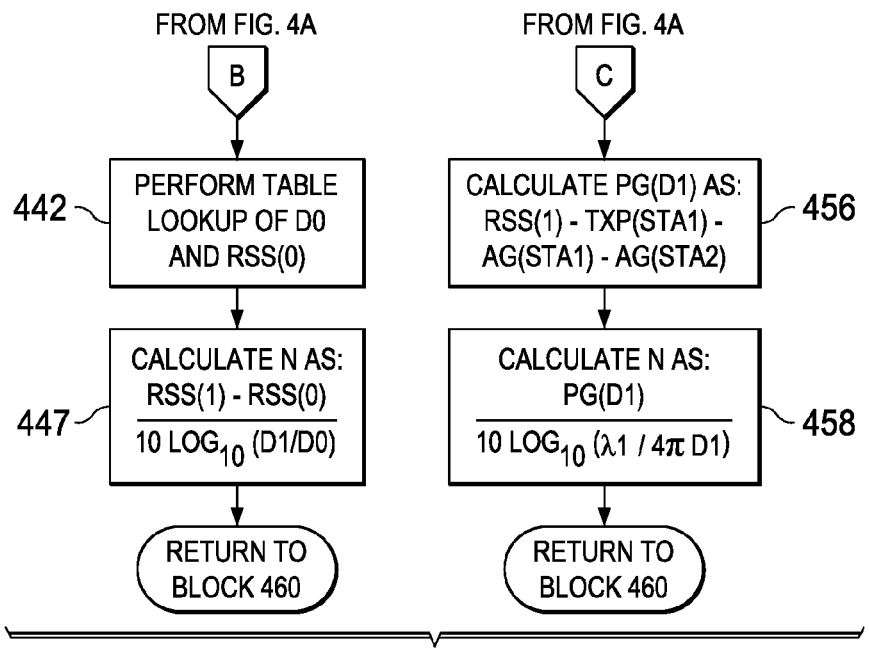

The method 400 thus commences at block 410 of FIG. 4A with measuring the TOF associated with one or more packet transmissions traversing a path between STA1 and STA2. A sub-method associated with the TOF measurements is detailed in FIG. 4B. Specifically, the method 400 proceeds at block 422 with receiving a first timing measurement action frame from STA2 at STA1. STA2 transmits the first timing measurement action frame at a time of departure T1. The method 400 continues at block 423 with measuring the time of arrival T2 of the first timing measurement action frame at STA1. The method 400 also includes sending an acknowledgment frame to STA2 from STA1 at a time of departure T3, at block 424. STA2 time-stamps the time-of-arrival T4 of the acknowledgment frame at STA2, at block 425. The method 400 further includes receiving, at STA1 from STA2, values corresponding to the time of departure T1 and the time of arrival T4 as determined at STA2, at block 426. The method 400 also includes calculating the TOF at STA1 as a quotient of a numerator (T2−T1+T4−T3) and a denominator equal to 2, at block 427. The method 400 returns to block 420 and includes multiplying the TOF by the speed of light C to obtain D1.

The method 400 continues at block 425 with receiving one or more informational messages at STA1 from STA2. Such messages may include the location of STA2, the transmit power level associated with STA2, the antenna gain associated with STA2, the location of STA3, the transmit power level associated with STA3, the antenna gain associated with STA3, and the path length D3 associated with a path between STA2 and STA3, for example. Data from informational messages may be used to determine the transmission path length D2 between STA1 and STA3 and may also be used in triangulation operations to determine the coordinate position of STA1.

The method 400 continues at block 430 with measuring the signal strength RSS(1) associated with transmissions originating at STA2 and received at STA1. Multiple RSS(1) measurements may be taken and averaged. The method 400 includes determining the path loss exponent N corresponding to channel characteristics of the path between STA1 and STA2. N is determined from D1, RSS(1), and stored values corresponding to certain path gain parameters. The latter stored values may be of at least two types.

In the first instance, the method 400 may calibrate N using a short-range, empirically-determined signal strength RSS (0), at block 440. RSS(0) may have been previously measured at a calibration receiver at a calibration distance D0 from a calibration transmitter. The calibration transmitter and receiver have transmit and receive power gains substantially equivalent to the transmit and receive power gains associated with STA1 and STA2. RSS(0) and D0 are subsequently stored in a lookup table at STA1. In this first case, the method 400 proceeds at block 442 of FIG. 4C with performing a lookup of D0 and RSS(0) at STA1. The method 400 then calculates N at block 447 as:

$$N=[RSS(1)-RSS(0)]/10*\log_{10}(D1/D0)$$

In the second instance, the method 400 may proceed at block 450 of FIG. 4A with calibrating N using a known antenna gain AG(STA1) associated with STA1, a known transmit power level TXP(STA2) and antenna gain AG(STA2) associated with STA2, and a wavelength corresponding to transmissions from STA2 to STA1. In this second case, the aforesaid power and antenna gain parameter values may be stored at STA1 and/or received from another network station including STA2. The method 400 may continue at block 456 of FIG. 4C with determining the path gain PG(D1) between STA1 and STA2 as:

$$PG(D1)=RSS(1)-TXP(STA2)-AG(STA1)-AG(STA2)$$

The method 400 may then continue at block 458 with determining the path loss exponent N as:

$$N=PG(D1)/10*\log_{10}(\lambda 1/4\pi D1),$$

λ1 (lambda-one) being the wavelength corresponding to transmissions from STA2 to STA1.

Having dynamically determined the path loss exponent N associated with the STA1-STA2 path using either of the above-described sub-methods, STA1 may use similar sub-methods to generalize N to determine channel characteristics associated with transmission paths to other stations. STA1 may, for example, use N to determine the transmission path length D2 between STA1 and STA3, as described in the following examples.

The method 400 continues at block 460 of FIG. 1 (from either block 447 or block 458) with measuring a received signal strength RSS(2) associated with transmissions from STA3 as received at STA1. STA1 may use sub-methods as described above to take into consideration transmission path gain/loss in determining D2.

Thus, in the first instance the method 400 may include calculating D2 as a function of the path loss exponent N, RSS(2), the calibrated received signal strength RSS(0), and the calibrated distance D0, at block 470. In this case, the method 400 proceeds at block 472 of FIG. 4D with dividing the quantity [RSS(2)−RSS(0)] by ten times the value of the path loss exponent N to obtain a path distance exponent PDE. In such case, the method 400 also includes multiplying the calibration distance D0 by ten exponentiated to the PDE to obtain D2, at block 474. In equation form:

$$D2=D0*10^{[(RSS(2)-RSS(0))/(10*N)]}$$

In the second instance, the method 400 proceeds at block 480 of FIG. 4A with calculating D2 as a function of N, RSS(2), a path gain PG(D2) associated with transmissions from STA3 to STA1, and a wavelength λ2 (lambda-two) corresponding to transmissions from STA3 to STA1.

Figure 4D:
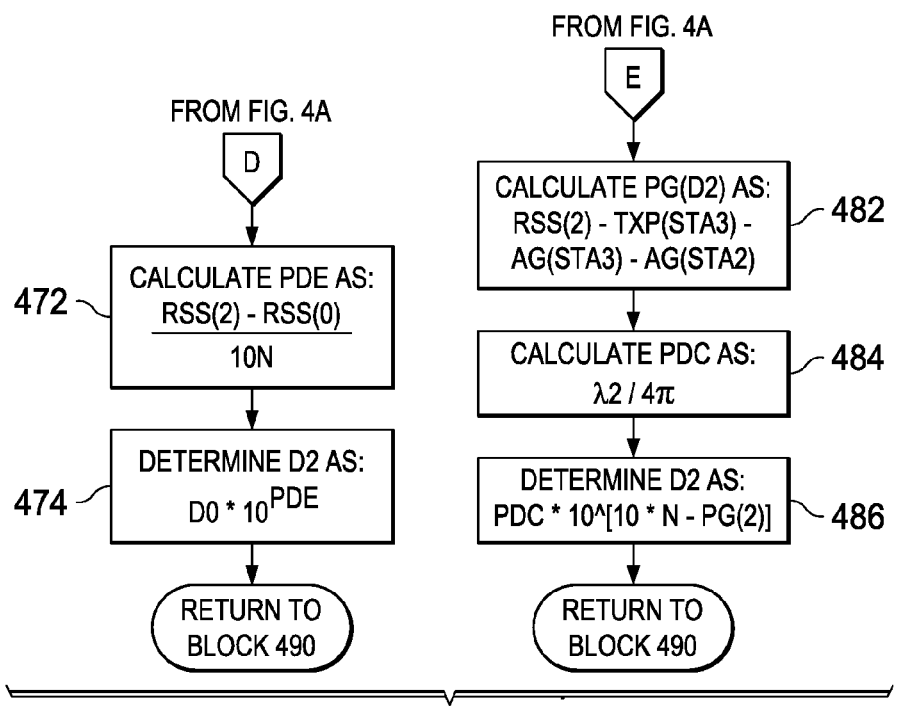

PG(D2) is calculated as RSS(2) minus the transmit power level TXP(STA3) of STA3 minus the antenna gain AG(STA3) corresponding to STA3 minus the antenna gain AG(STA1) corresponding to STA1, at block 482 of FIG. 4D:

$$PG(D2)=RSS(2)-TXP(STA3)-AG(STA3)-AG(STA1)$$

The method 400 continues at block 484 with dividing λ2 by four times pi (4π) to obtain a path distance coefficient (PDC). The method 400 further includes multiplying the PDC by ten exponentiated to a quantity of ten times N minus PG(D2) to obtain D2, at block 486:

$D2=PDC*10^{[10*N-PG(2)]}$, where $PG(2)=RSS(2)-TXP(STA3)-AG(STA3)-AG(STA1)$.

The method 400 thus includes determining the path loss exponent N for a communication channel associated with transmissions received at a first wireless station from a second wireless station. The method 400 may also include generalizing N to determine derivative channel characteristics corresponding to other, similarly situated stations. In the example above, the method 400 includes using N to determine the path length D2 between the first and second wireless stations. Knowing D2 may be useful for various purposes. For example, the method 400 may proceed at block 490 of FIG. 1 with trilaterating a coordinate position of STA1 as a function of a coordinate position of STA2, a coordinate position of STA3, and the transmission path lengths D1 and D2, as previously described in conjunction with FIG. 2.

It is noted that the activities described herein may be executed in an order other than the order described. Some versions of the method 400 may cause some activities to be performed and others to be skipped. The various activities described with respect to the methods identified herein may also be executed in repetitive, serial, and/or parallel fashion. In some embodiments, for example, the method 400 may repeat in whole or in part as various applications associated with a PMC device are switched on and off during operation.

Apparatus, systems, and methods described herein enable a first wireless station to dynamically calibrate a communication channel path loss exponent. The path loss exponent is determined from parameters associated with transmissions received from a second wireless station, including time-of-flight and received signal strength. The path loss exponent may then be extrapolated to communication channels associated with one or more additional stations similarly situated. Useful information such as station-to-station transmission path lengths may be derived from the dynamically-calculated channel path loss exponent. Functionality such as short-range, indoor navigation may be enabled and/or enhanced as a result.

Although the inventive concept may include embodiments described in the example context of an Institute of Electrical and Electronic Engineers (IEEE) standard 802.xx implementation (e.g., 802.11, 802.11a, 802.11b, 802.11e, 802.11g, 802.16, 802.16e™, etc.), the claims are not so limited. Additional information regarding the IEEE 802.11 standard may be found in ANSI/IEEE Std. 802.11, Information technology—Telecommunications and information exchange between systems—Local and metropolitan area networks—Specific requirements—Part 11: Wireless LAN Medium Access Control (MAC) and Physical Layer (PHY) Specifications (published 1999; reaffirmed June 2003). Additional information regarding the IEEE 802.11a protocol standard may be found in IEEE Std 802.11a, Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications—High-speed Physical Layer in the 5 GHz Band (published 1999; reaffirmed Jun. 12, 2003). Additional information regarding the IEEE 802.11b protocol standard may be found in IEEE Std 802.11b, Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band (approved Sep. 16, 1999; reaffirmed Jun. 12, 2003). Additional information regarding the IEEE 802.11e standard may be found in IEEE 802.11e Standard for Information technology—Telecommunications and information exchange between systems—Local and metropolitan area networks—Specific requirements Part 11: Wireless LAN Medium Access Control (MAC) and Physical Layer (PHY) specifications: Amendment 8: Medium Access Control (MAC) Quality of Service Enhancements (published 2005). Additional information regarding the IEEE 802.11g protocol standard may be found in IEEE Std 802.11g™, IEEE Std 802.11g™, IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 4: Further Higher Data Rate Extension in the 2.4 GHz Band (approved Jun. 12, 2003). Additional information regarding the IEEE 802.16 protocol standard may be found in IEEE Standard for Local and Metropolitan Area Networks—Part 16: Air Interface for Fixed Broadband Wireless Access Systems (published Oct. 1, 2004).

Embodiments of the invention may be implemented as part of a wired or wireless system. Examples may also include embodiments comprising multi-carrier wireless communication channels (e.g., orthogonal frequency division multiplexing (OFDM), discrete multitone (DMT), etc.) such as may be used within a wireless personal area network (WPAN), a wireless local area network (WLAN), a wireless metropolitan area network (WMAN), a wireless wide area network (WWAN), a cellular network, a third generation (3G) network, a fourth generation (4G) network, a universal mobile telephone system (UMTS), and like communication systems, without limitation.

By way of illustration and not of limitation, the accompanying figures show specific embodiments in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense. The breadth of various embodiments is defined by the appended claims and the full range of equivalents to which such claims are entitled.

Such embodiments of the inventive subject matter may be referred to herein individually or collectively by the term "invention" merely for convenience and without intending to voluntarily limit this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims.

In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description, with each claim standing on its own as a separate embodiment.

What is claimed is:

1. A wireless channel calibration apparatus, comprising:
   a time-of-flight (TOF) distance module to measure a TOF associated with packet transmissions traversing a path between a first wireless station (STA1) incorporating the wireless channel calibration apparatus and a second wireless station (STA2) and to calculate a length (D1) associated with the STA1-STA2 path;
   a received signal strength (RSS) module to measure at least one received signal strength RSS(1) associated with at least one of the packet transmissions;
   a dynamic channel module communicatively coupled to the TOF distance module and to the RSS module to dynamically calculate a value of a path loss exponent (N) associated with the STA1-STA2 path as a function of at least the length D1 and the RSS(1);
   a path gain module communicatively coupled to the RSS module to determine a value of a path gain associated with the path between the STA1 and the STA2 as the received signal strength value RSS(1) minus a known transmit power level TXP(STA2) associated with transmissions from the STA2 minus a known antenna gain value AG(STA1) associated with the STA1 minus a known antenna gain value AG(STA2) associated with the STA2; and
   a path gain parameter table communicatively coupled to the path gain module to store at least one of the transmit power level TXP(STA2), the antenna gain value AG(STA2), the antenna gain value AG(STA1), a transmit power level TXP(STA3) associated with a third wireless station (STA3), an antenna gain value AG(STA3) associated with the STA3, a wavelength λ1 (lambda-one) associated with transmissions from the STA2, or a wavelength λ2 (lambda-two) associated with transmissions from the STA3.

2. The wireless channel calibration apparatus of claim 1, further comprising:
   a channel calibration lookup table communicatively coupled to the dynamic channel module to store a calibrated received signal strength value RSS(0) measured at a calibration receiver at a calibration distance D0 from a calibration transmitter, the calibration transmitter and receiver having transmit and receive power gains substantially equivalent to transmit and receive power gains associated with the STA1 and the STA2.

3. The wireless channel calibration apparatus of claim 2, further comprising:
   a path distance module communicatively coupled to the dynamic channel module to receive at least one of N, the value RSS(0), the calibration distance D0, a received signal strength value RSS(2) associated with transmissions from a third wireless station (STA3) as received at the STA1, a wavelength of a carrier wave associated with the transmissions from the STA3, or a value of a path gain PG(D2) associated with a transmission path between the STA1 and the STA3, the path distance module to calculate a length D2 associated with the STA1-STA3 path.

4. The wireless channel calibration apparatus of claim 3, further comprising:
   a trilateration module communicatively coupled to the path distance module to determine a coordinate position of the STA1 using the D1, the D2, a coordinate position of the STA2, and a coordinate position of the STA3.

5. The wireless channel calibration apparatus of claim 1, further comprising:
   a transceiver communicatively coupled to the TOF distance module to receive the packet transmissions.

6. A wireless channel calibration method, comprising:
   measuring a time-of-flight (TOF) associated with packet transmissions traversing a path between a first wireless station (STA1) and a second wireless station (STA2);
   calculating a length (D1) corresponding to the STA1-STA2 path using the TOF;
   at the STA1, measuring at least one received signal strength to obtain a value RSS(1) associated with the packet transmissions;
   dynamically calculating a value of a path loss exponent (N) associated with the STA1-STA2 path as a function of at least the path length D1 and the RSS(1);
   performing a lookup of a calibrated received signal strength RSS(0) measured at a calibration receiver at a distance D0 from a calibration transmitter, the calibration transmitter and receiver having power gains substantially equivalent to transmit and receive power gains associated with the STA1 and the STA2;
   calculating the value of the path loss exponent N as a quotient of a numerator equal to RSS(1)−RSS(0) and a denominator equal to 10*log(D1/D0);
   at the STA1, measuring at least one received signal strength to obtain a value RSS(2) associated with transmissions originating at a third wireless station (STA3) and received at the STA1;
   calculating a length D2 associated with a transmission path between the STA1 and the STA3 as a function of the path loss exponent N, the calibrated received signal strength RSS(0), the calibration distance D0, and the RSS(2);
   dividing a quantity [RSS(2)−SS(0)] by ten times the value of the path loss exponent N to obtain a path distance exponent PDE; and
   multiplying the calibration distance D0 by ten exponentiated to the path distance exponent PDE to obtain the STA1-STA3 transmission path length D2.

7. The wireless channel calibration method of claim 6, further comprising:
   at the STA1, receiving a first timing measurement action frame transmitted at a time of departure T1 from the STA2;
   at the STA1, measuring a time of arrival T2 associated with an arrival of the first timing measurement action frame;
   at the STA1, sending an acknowledgment frame to the STA2 at a time of departure T3, the acknowledgment frame to be time stamped at a time of arrival T4 at the STA2;
   at the STA1, receiving timing values from the STA2 corresponding to the time of departure T1 and the time of arrival T4; and
   at the STA1, calculating the TOF as a quotient having a numerator of a quantity T2 minus T1 plus T4 minus T3 and having a denominator of 2.

8. The wireless channel calibration method of claim 7, further comprising:
   multiplying the TOF by a speed of light value (C) to obtain the path length D1.

9. The wireless channel calibration method of claim 6, further comprising:
   trilaterating a coordinate position of the STA1 as a function of a coordinate position of the STA2, a coordinate position of the STA3, and the transmission path lengths D1 and D2.

10. The wireless channel calibration method of claim 6, further comprising:
   calculating a path gain value PG(D1) associated with transmissions between the STA2 and the STA1 over the path of length D1 as the RSS(1) minus a transmit power level TXP(STA2) of the STA2 minus an antenna gain value AG(STA2) associated with the STA2 minus an antenna gain value AG(STA1) associated with the STA1; and
   alternatively, calculating the value of the path loss exponent N as a quotient of a numerator equal to PG(D1) and a denominator equal to $10*\log(\lambda 1/4\pi D1)$, $\lambda 1$ (lambda-one) representing a wavelength of the transmissions between the STA2 and the STA1.

11. The wireless channel calibration method of claim 10, further comprising:
   at the STA1, measuring at least one received signal strength associated with transmissions originating at a third wireless station (STA3) to obtain a value RSS(2); and
   alternatively, calculating a path length D2 associated with a transmission path between the STA1 and the STA3 as a function of the value RSS(2), the path loss exponent N, a path gain value PG(D2) associated with the transmissions originating at the STA3, and a wavelength $\lambda 2$ (lambda-two) of the transmissions between the STA1 and the STA3.

12. The wireless channel calibration method of claim 11, further comprising:
   calculating the path gain value PG(D2) as the value RSS(2) minus a transmit power level TXP(STA3) corresponding to the STA3 minus an antenna gain value AG(STA3) associated with the STA3 minus an antenna gain value AG(STA1) associated with the STA1;
   dividing $\lambda 2$ by four times pi ($4\pi$) to obtain a path distance coefficient (PDC); and
   multiplying the PDC by ten exponentiated to a quantity of ten times N minus the PG(D2): (PDC*10^(10*N−PG(D2)) to obtain the path length D2.

13. The wireless channel calibration method of claim 6, further comprising:
   at the STA1, receiving a message from the STA2 containing at least one parameter value including a location of the STA2, a transmit power level associated with the STA2, an antenna gain associated with the STA2, a location of a third wireless station (STA3), a transmit power level associated with the STA3, an antenna gain associated with the STA3, or a path length D3 associated with a transmission path between the STA2 and the STA3.

14. A wireless channel calibration method, comprising:
   measuring a time-of-flight (TOF) corresponding to packet transmissions traversing a path between a first wireless station (STA1) and a second wireless station (STA2);
   calculating a path length (D1) associated with the STA1-STA2 transmission path using the TOF;
   at the STA1, measuring at least one signal strength to obtain a value RSS(1) associated with transmissions originating at the STA2;
   performing a lookup of a calibrated received signal strength RSS(0) measured at a calibration receiver positioned at a calibration distance D0 from a calibration transmitter, the calibration transmitter and receiver having power gains substantially equivalent to transmit and receive power gains associated with the STA1 and the STA2;
   calculating a value of a path loss exponent N associated with the STA1-STA2 path as a quotient of a numerator equal to RSS(1)−RSS(0) and a denominator equal to $10*\log(D1/D0)$;
   at the STA1, measuring at least one received signal strength value RSS(2) corresponding to transmissions originating at a third wireless station (STA3);
   dividing a quantity [RSS(2)−RSS(0)] by ten times the value of the path loss exponent N to obtain a path distance exponent PDE;
   multiplying the calibration distance D0 by ten exponentiated to the path distance exponent PDE to obtain a path length D2 corresponding to a transmission path between the STA1 and the STA3; and
   trilaterating a coordinate position of the STA1 as a function of a coordinate position of the STA2, a coordinate position of the STA3, and the path lengths D1 and D2.

15. The wireless channel calibration method of claim 14, further comprising:
   calculating a path gain value PG(D1) associated with the STA1-STA2 transmission path as the value RSS(1) minus a transmit power level TXP(STA2) associated with the STA2 minus an antenna gain value AG(STA2) associated with the STA2 minus an antenna gain value AG(STA1) associated with the STA1; and
   alternatively, calculating the value of the path loss exponent N as a quotient of a numerator equal to the value PG(D1) and a denominator equal to $10*\log(\lambda 1/4\pi D1)$, $\lambda 1$ (lambda-one) representing a wavelength corresponding to the transmissions originating at the STA2.

* * * * *